United States Patent [19]

Thedford et al.

[11] Patent Number: 5,036,649

[45] Date of Patent: Aug. 6, 1991

[54] COTTON CONVEYING STRUCTURE FOR A COTTON HARVESTER

[75] Inventors: G. Neil Thedford, Naperville; Michael J. Covington, LaGrange; Earl R. Snyder, Bolingbrook; Lee F. Garter, Western Springs; Jesse H. Orsborn, Hinsdale, all of Ill.

[73] Assignee: J. I. Case Company, Racine, Wis.

[21] Appl. No.: 546,086

[22] Filed: Jun. 29, 1990

[51] Int. Cl.⁵ .................................... A01D 46/10
[52] U.S. Cl. ........................ 56/13.3; 56/30; 56/DIG. 8
[58] Field of Search .................. 56/28, 30, 31, 32, 40, 56/41, 50, 1, DIG. 5, DIG. 8, 12.8, 13.3

[56] References Cited

U.S. PATENT DOCUMENTS

| | | | |
|---|---|---|---|
| 2,729,513 | 1/1956 | Swim, Jr. | |
| 4,501,112 | 2/1985 | Thedford et al. | 56/30 |
| 4,660,359 | 4/1987 | Deutsch | 56/13.3 |
| 4,875,330 | 10/1989 | Deutsch et al. | 56/28 |
| 4,928,459 | 5/1990 | Thedford et al. | 56/32 |
| 4,930,299 | 1/1990 | McBee | 56/30 |

Primary Examiner—Terry Lee Melius
Attorney, Agent, or Firm—Dressler, Goldsmith, Shore, Sutker & Milnamow, Ltd.

[57] ABSTRACT

A cotton conveying structure for a laterally movable cotton harvesting unit of a cotton harvester. The cotton conveying structure comprises a cotton receiving assembly and a duct structure. The cotton receiving assembly vertically moves with and is inhibited against lateral movement to a tool bar assembly on which the harvesting unit is supported for lateral movement. The cotton receiving assembly includes first and second conveying sections which remain integrally connected to each other while allowing relative lateral movement of the harvesting unit from a harvesting position to permit servicing thereof. By inhibiting its lateral movement, the cotton receiving assembly is aligned in a cotton conveying relationship with and when the harvesting unit is returned to its harvesting position.

11 Claims, 7 Drawing Sheets

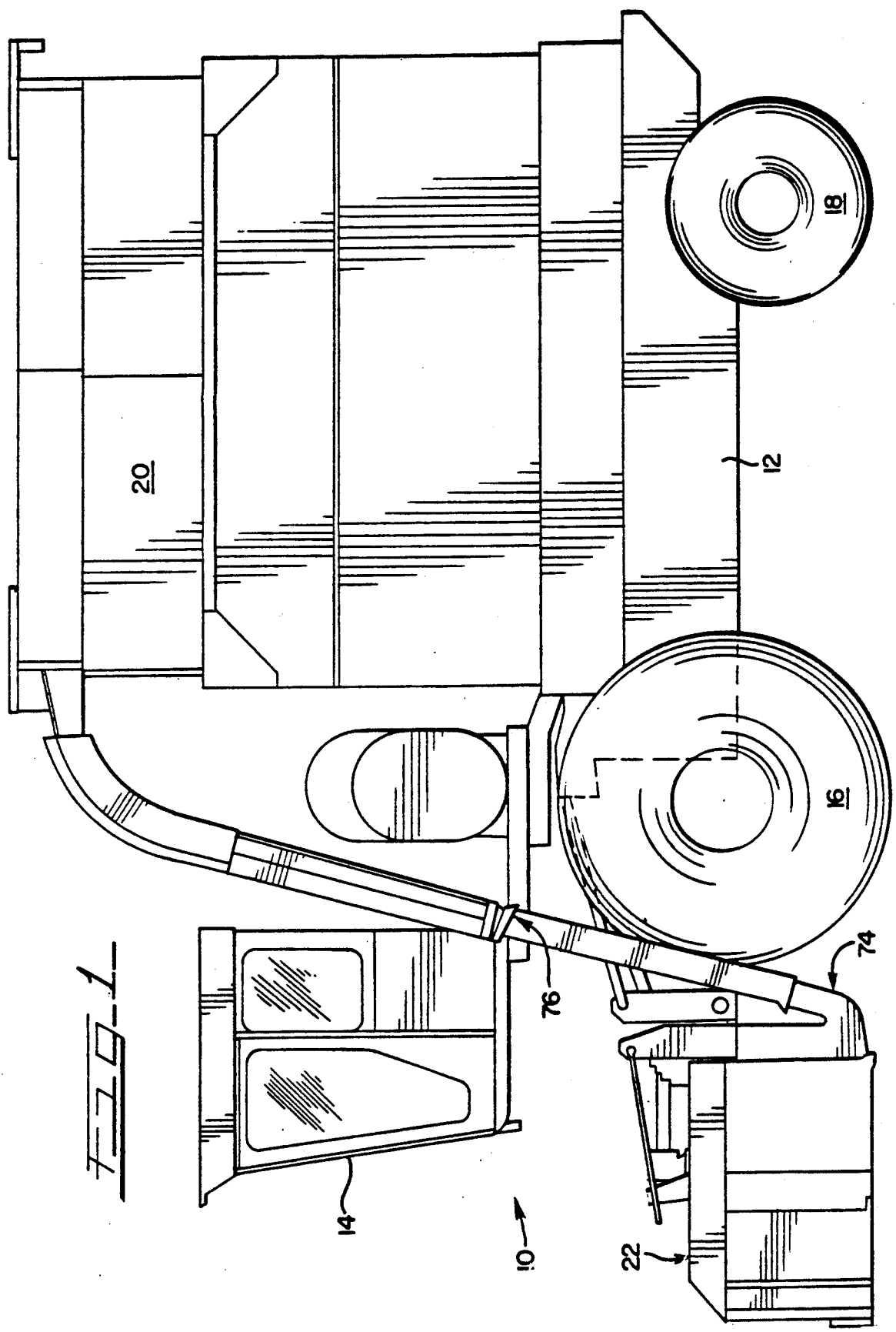

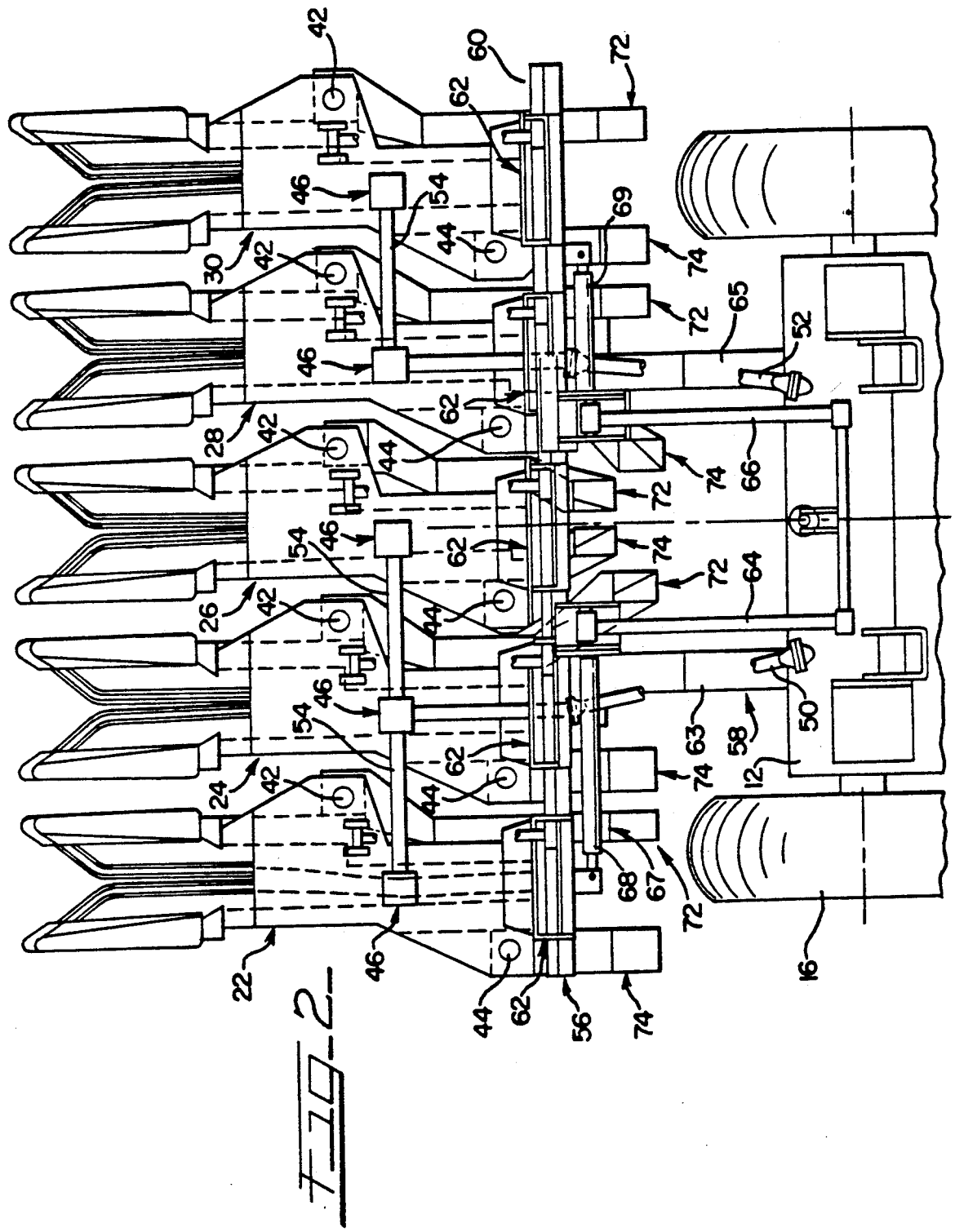

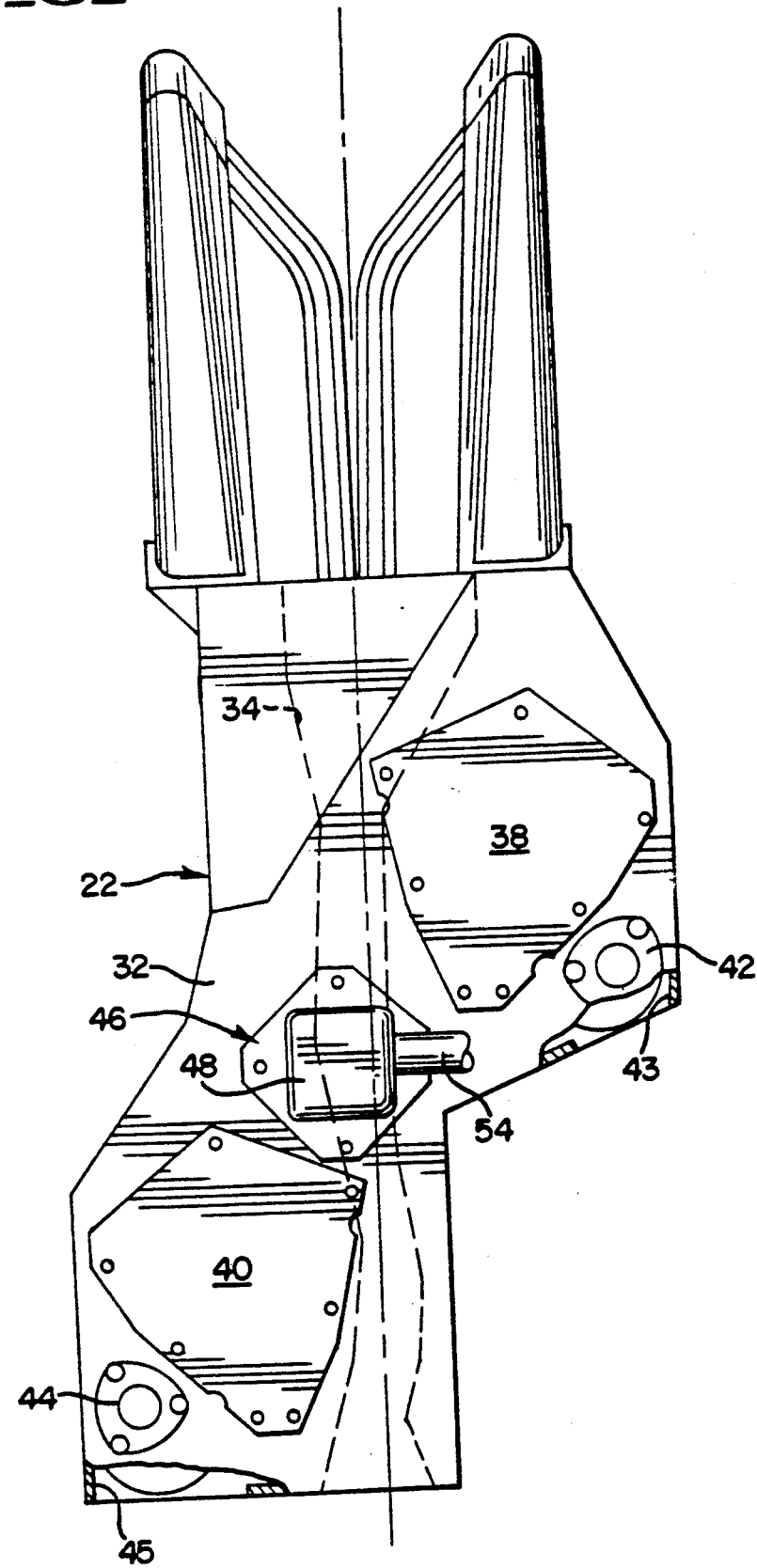

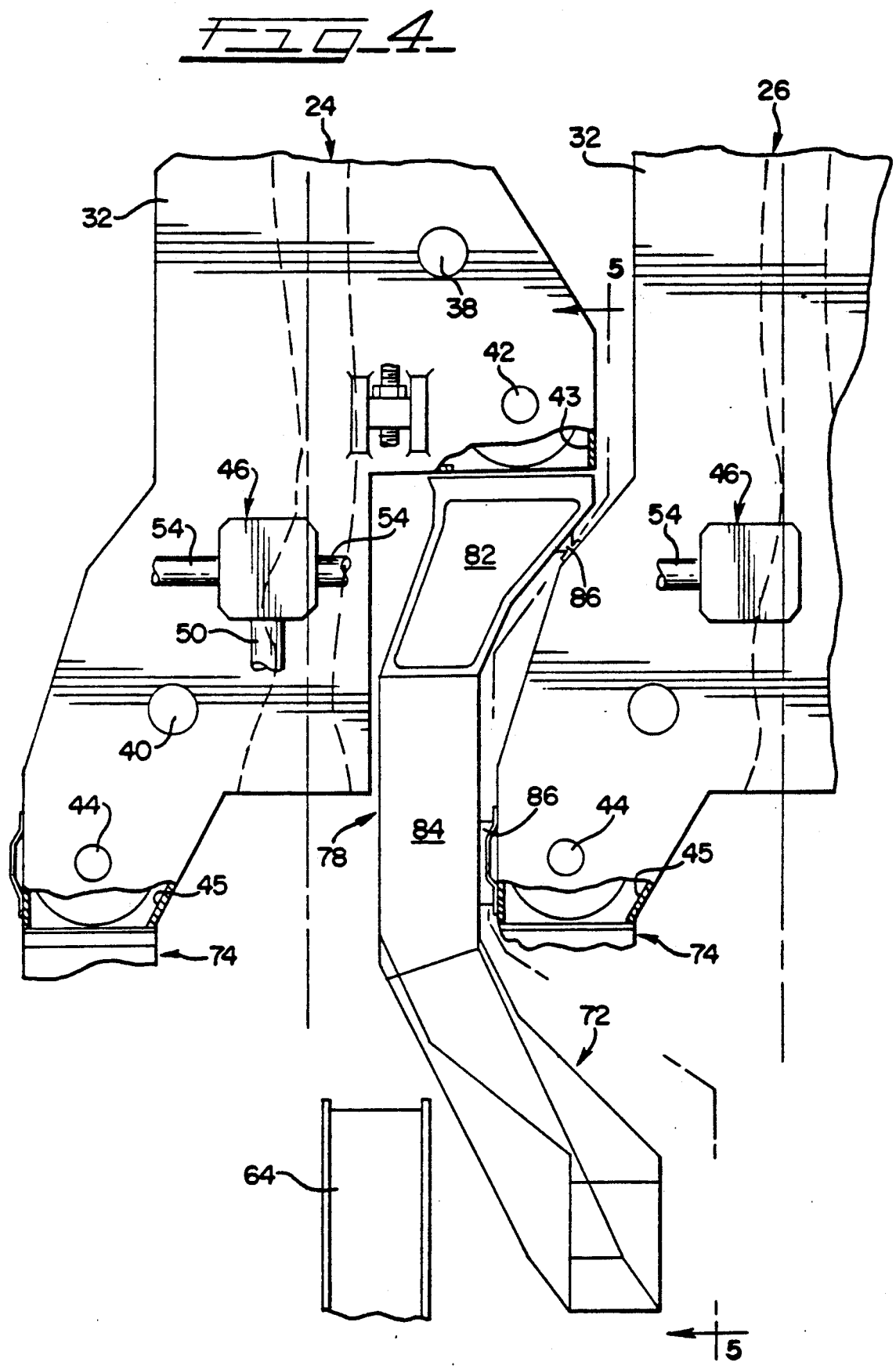

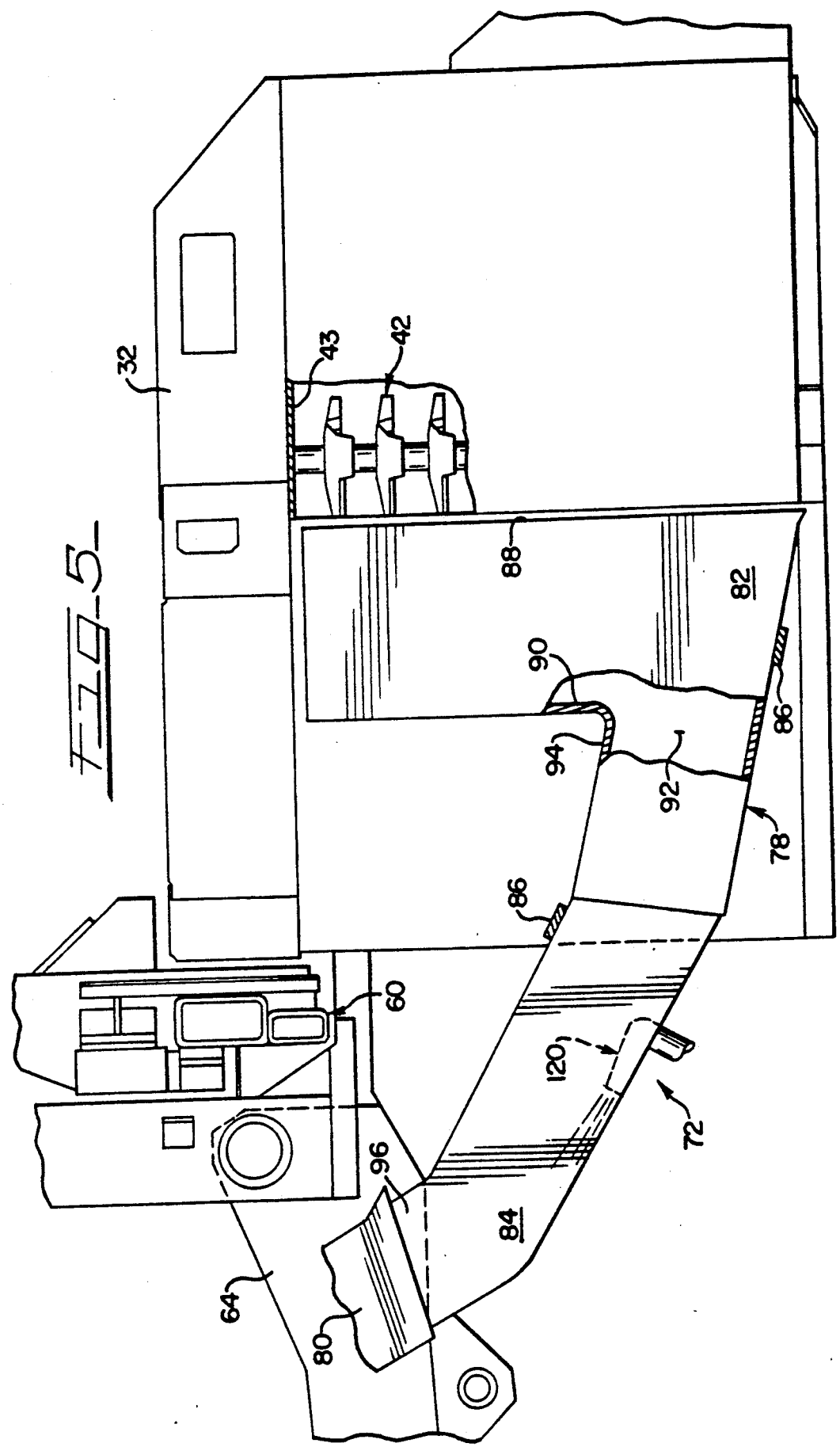

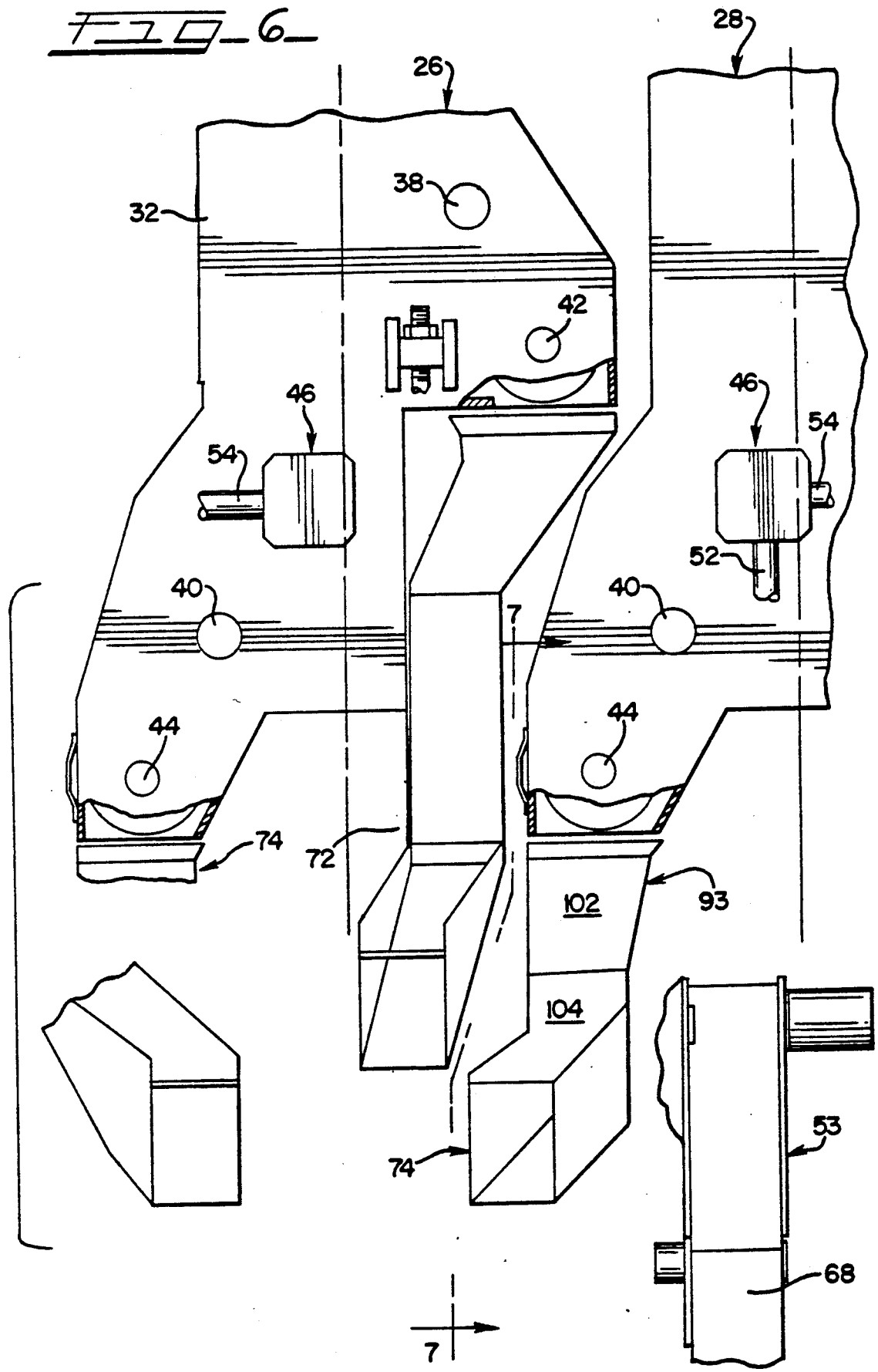
FIG_6_

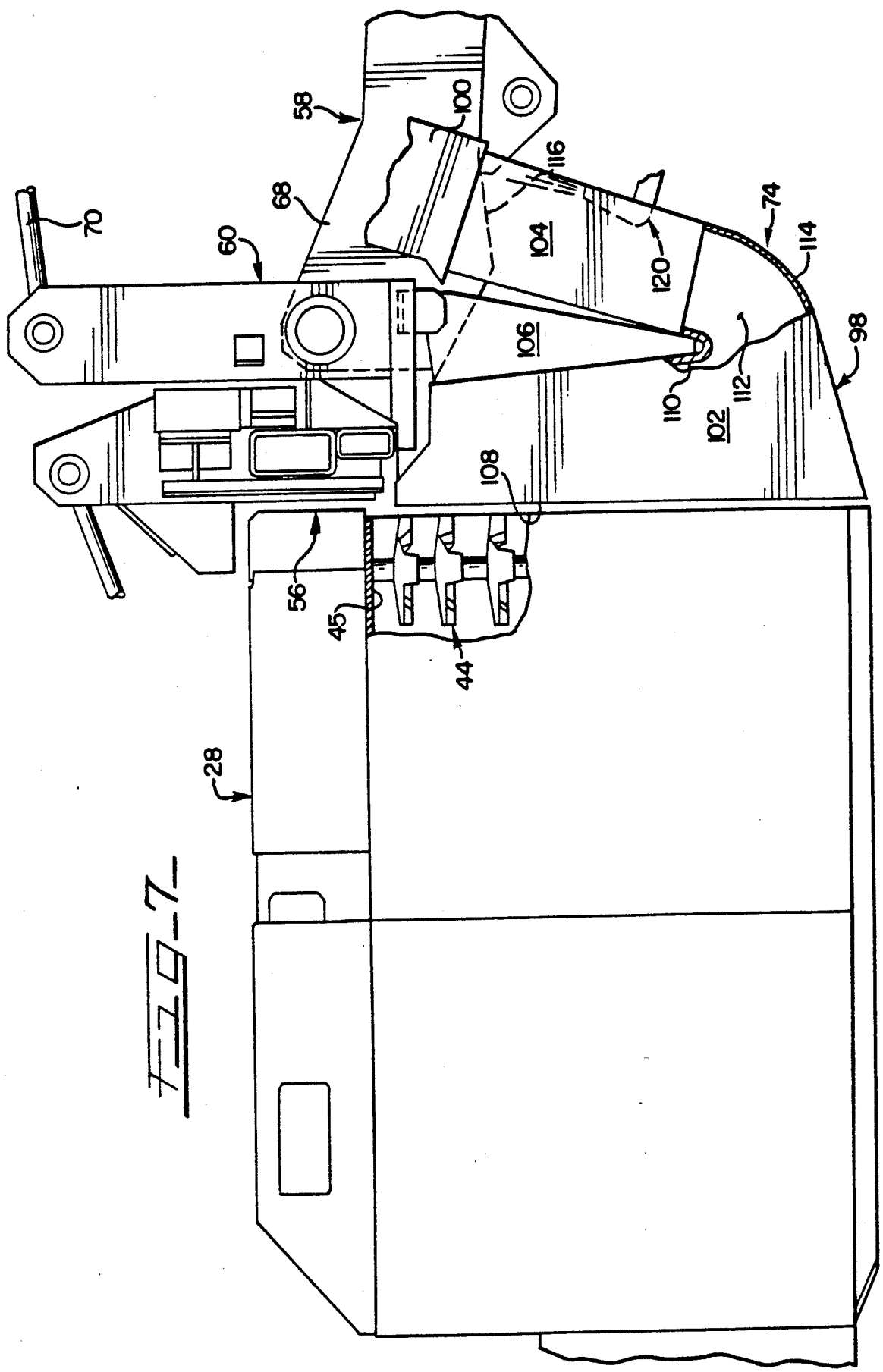

COTTON CONVEYING STRUCTURE FOR A COTTON HARVESTER

FIELD OF THE INVENTION

The present invention generally relates to cotton harvesters and, more particularly, to a cotton conveying structure for a harvesting unit of a cotton harvester.

BACKGROUND OF THE INVENTION

A typical cotton harvester includes a plurality of harvesting units arranged side-by-side at a forward end of the harvester. To enhance productivity of the harvester, up to five harvesting units are arranged laterally across the forward end of a harvester frame.

Each harvesting unit is individually connected to a laterally elongated support structure including a lift assembly. The lift assembly includes a pair of laterally spaced arms which extend forward from and whose angular orientation relative to the frame determines the vertical disposition of the support structure and, thus, the harvesting units relative to the ground.

Each harvesting unit includes a housing wherein a cotton harvesting mechanism is rotatably arranged. A typical harvesting mechanism includes a pair of upright picker rotor assemblies and a pair of upright doffer assemblies arranged in operative combination with each other. As the harvester is driven through a cotton field, the picker rotor assemblies remove the cotton from the plants and the doffer assemblies remove or doff the cotton from the picker rotor assemblies.

The doffed cotton is propelled from the harvesting unit housing by the doffer assembly and into a conveying structure. A conventional conveying structure includes a compartment or door structure and an elongated duct structure. The door structure is typically connected to the harvesting unit to receive the doffed cotton. The duct structure is connected to and extends from the door structure for directing the doffed cotton to a suitable receptacle or basket.

When harvesting narrow row cotton, the harvesting units are arranged in close relation (about 30 inch lateral spacing) relative to each other. Therefore, access between the units for inspection and servicing thereof is extremely limited. Recent advancements, however, promote lateral movement of the harvesting units along the support structure. As will be appreciated, lateral movement of the harvesting units relative to each other facilitates inspectional and service access therebetween.

Considerable design effort has reduced both the size and weight of the harvesting units. Such efforts notwithstanding, the required use and operation of the harvesting units mandate a relatively large-sized mechanism which is constructed for extensive and rugged use. Besides the size and weight of the harvesting unit, the attachment of the conveying structure to the harvesting unit further complicates the problem of laterally moving the harvesting units.

As will be appreciated, disconnecting the cotton conveying structure from the harvesting unit to facilitate its lateral movement is awkward and time consuming. The problem is exacerbated when other panels or portions on the harvesting unit must be removed to gain access to the picker rotor assemblies or doffer assemblies. Of course, during a harvesting operation, time is at a premium.

Commonly assigned U.S. Pat. No. 4,501,112 discloses an improved cotton duct structure for a cotton harvester. A salient feature of such duct structure is a hinge-like connection between a lower duct extension and an upper duct extension. The hinge connection allows for limited lateral movement of a portion of the duct structure along with lateral displacement of the harvesting unit to which it is connected to facilitate access between the units. As long as the conveying structure extends outwardly of the lift arms of the lift assembly, there is adequate space for lateral movement of a portion of the duct structure along with the harvesting unit.

When a harvester is equipped with four or more harvesting units to maximize picking capacity, however, some of the conveying structures on inboard harvesting units extend through a limited space defined between the spaced arms of the lift assembly and, thus, cannot be laterally moved outward due to structural or drive line interferences. Accordingly, the restricted or confined movement of the conveying structure connected to the inboard harvesting units limits lateral displacement of the harvesting unit connected thereto or the conveying structure needs to be disconnected from the harvesting unit to permit adequate lateral displacement of the harvesting unit.

As will be appreciated, limited lateral displacement of the harvesting unit fails to provide the adequate space required for proper servicing of the harvesting units. Accordingly, valuable harvesting time is consumed disconnecting the harvesting unit to permit adequate lateral displacement and thereby allowing proper servicing of the harvesting unit. Moreover, when the harvesting unit is returned to its harvesting position, valuable harvesting time is spent reconnecting the conveying structure to the harvesting unit. The inboard location of the harvesting units to which the conveying structure is attached furthermore complicates operator access to effect disconnection and reconnection of the conveying structure relative to the respective harvesting unit and detracts from harvesting operations.

Thus, there is a need and a desire for a cotton conveying structure which will allow lateral movement of a respective harvesting unit relative thereto while maintaining its integrity as a structure thereby reducing the amount of time required to service the harvesting unit.

SUMMARY OF THE INVENTION

In view of the above, and in accordance with the present invention, there is provided an improved cotton conveying structure including a cotton receiving assembly and a duct structure extending from the cotton receiving assembly. The cotton receiving assembly of the conveying structure vertically moves with and allows lateral movement of a respective harvesting unit of a cotton harvester relative thereto. The cotton receiving assembly is aligned in a cotton conveying relationship with the harvesting unit when the harvesting unit is in a harvesting position and preferably includes first and second conveying sections which are inhibited against lateral movement and remain integrally connected to each other while allowing for relative lateral movement of the harvesting unit from its harvesting position to permit servicing thereof. By inhibiting its lateral movement, the cotton receiving assembly is aligned in a cotton conveying relationship with and when the harvesting unit is returned to its harvesting position.

To promote the picking capacity of the cotton harvester, a plurality of harvesting units are arranged sideby-side at a forward end of the harvester which includes a cotton receptacle or basket. The harvesting units are individually connected to and supported by a support structure. The support structure is carried at a forward end of a lift assembly which includes a pair of laterally spaced lift arms connected to and extending forwardly from a frame of the cotton harvester. At least one of the harvesting units is mounted for lateral movement on the support structure relative to an adjacent and stationary harvesting unit to enhance spacing therebetween thereby facilitating inspectional and service access.

Each harvesting unit includes a housing defining a fore-and-aft plant passage. Each harvesting unit further includes a pair of upright picker spindle rotor assemblies arranged within the housing for removing cotton from the plants as the harvester is driven across the field. Arranged in combination with each picker spindle rotor assembly is an upright doffer assembly for doffing cotton from the respective spindle rotor assemblies and propelling the doffed cotton through a discharge opening defined by the housing.

In the illustrated embodiment, each harvesting unit has two cotton conveying structures extending rearwardly therefrom. One cotton conveying structure is associated with each spindle rotor assembly and associated doffer assembly for conveying doffed cotton from a respective discharge opening in the harvesting unit housing. Each cotton conveying structure directs doffed cotton from the respective harvesting unit to the cotton receptacle or basket.

The present invention is concerned with the conveying structure associated with the movable harvesting unit and which extends between the lift arms of the lift assembly. As mentioned above, the conveying structure of the present invention includes a cotton receiving assembly with first and second conveying sections and a duct structure extending from the receiving assembly. The first conveying section of the cotton receiving assembly directly receives doffed cotton from the doffer assembly through an inlet which, when the harvesting unit is in a harvesting position, is generally aligned with the respective discharge opening in the housing of the harvesting unit and allows for lateral movement of the harvesting unit relative to the conveying structure. The second conveying section of the cotton receiving assembly is integrally connected to and in conveying relationship with the first conveying section for conveying doffed cotton to the duct structure and, ultimately, to the cotton receiving receptacle.

In a preferred form of the invention, the first conveying section is a vertically elongated suction door. The inlet to the first conveying section extends of substantially coequal length to the respective discharge opening in the harvesting unit housing. The first conveying section is held in a stationary fashion relative to the support structure such that, when the harvesting unit is laterally returned to its harvesting position, the inlet to the first conveying section is positioned in cotton conveying relation with the respective discharge opening on the cotton harvester housing. The first conveying section furthermore defines an outlet through which cotton flows to the second conveying section.

The second conveying section of the cotton receiving assembly is arranged in cotton conveying relation with the outlet in the first conveying structure and serves to direct doffed cotton to the duct structure extending between the lift arms of the lift assembly. The first and second conveying sections are supported in a stationary fashion from either the support structure or the adjacent stationary harvesting unit. The second conveying section is integrally connected to the first conveying section.

An air directing apparatus is arranged in combination with the cotton receiving assembly to enhance the movement of cotton toward the receptacle or basket. In a preferred form, such air directing apparatus includes an air nozzle extending within the second conveying structure for directing air downstream of and thereby creating a vacuum at the outlet of the first conveying section for facilitating passage of cotton therethrough.

The ability to laterally move a harvesting unit relative to the cotton conveying structure associated therewith while maintaining the integrity of the conveying structure facilitates harvester productivity by reducing the time required to service the harvesting units. By allowing relative movement between the harvesting unit and the conveying structure, the present invention eliminates the need for fasteners and other connectors conventionally used to attach the conveying structure to the harvesting unit. Moreover, the ability to allow relative lateral movement of the harvesting unit while allowing at least a portion of the conveying structure to extend through a limited space defined between the lift arms of the lift assembly will simplify the design and construction of the conveying structure while avoiding structural and driveline interferences. By providing an air directing nozzle in combination with the conveying structure will furthermore facilitate movement of the cotton toward the cotton receiving receptacle.

Numerous other advantages and features of the present invention will become apparent from the following detailed description, the accompanying drawings and the appended claims.

BRIEF DESCRIPTION OF THE DRAWINGS

FIG. 1 is a side-elevational view of a cotton harvester;

FIG. 2 is a plan view of a forward end of the cotton harvester with a plurality of harvesting units supported thereon for lateral movement relative to each other to enhance access between the units;

FIG. 3 is an enlarged plan view of a harvesting unit;

FIG. 4 is a plan view of a pair of cotton harvesting units with cotton conveying structure embodying principles of the present invention being associated therewith;

FIG. 5 is a side elevational view taken along line 5—5 of FIG. 4;

FIG. 6 is a plan view of a pair of cotton harvesting units with cotton conveying structure embodying principles of the present invention extending therefrom; and FIG. 7 is a side elevational view taken along line 7—7 of FIG. 6.

DETAILED DESCRIPTION OF THE PRESENT INVENTION

While the present invention is susceptible to embodiment in various forms, there is shown in the drawings presently preferred embodiments hereinafter described with the understanding that the present disclosure sets forth exemplifications of the invention which are not intended to limit the invention to the specific embodiments illustrated.

Referring now to the drawings, wherein like reference numerals indicate like parts throughout the several views, there is shown a self-propelled cotton harvester 10. The cotton harvester 10 includes a fore-and-aft extending frame 12 having an operator station 14 arranged at a forward end thereof. The frame 12 is supported on a front pair of drive wheels 16 and a rear pair of steering wheels 18 which provide the harvester 10 with proper direction. In the preferred embodiment, a cotton receiving basket or receptacle 20 is mounted on the frame 12.

As illustrated in FIG. 2, positioned forwardly on the frame 12 are a plurality of individual cotton harvesting units 22, 24, 26, 28 and 30. As illustrated, the harvesting units are arranged in a side-by-side relationship for harvesting adjacent and generally parallel rows of cotton. It should be appreciated, however, that this invention equally applies to a lesser or greater number of harvesting units than that illustrated.

In a preferred form of the invention, each harvesting unit is substantially similar in structure. Accordingly, only a description of harvesting unit 22 will be provided with the understanding that the other harvesting units are similarly structured.

Turning now to FIG. 3, each harvesting unit includes a housing 32 defining a fore-and-aft crop receiving opening or plant passage 34. Each harvesting unit is further provided with stalk lifters forwardly extending from housing 32 on opposite sides of opening 34 to guide the row of plants to the opening or passage 34.

As illustrated in FIG. 3, each harvesting unit further includes forward and rear upright picker rotor assemblies 38 and 40 which, in the preferred embodiment are arranged on opposite sides of the fore-and-aft plant passage 34. Adjacent the picker rotor assemblies 38 and 40 are conventional upright doffer assemblies 42 and 44, respectively, which remove or doff cotton from the picking spindles on the picker rotor assemblies 38 and 40.

Each doffer assembly 42 and 44 is conventionally constructed with a series of vertically spaced, circularly configured doffer pads. During operation, the doffer pads remove or doff the cotton from the picker spindles on the respective rotor assembly and propel the doffed cotton outwardly through discharge openings 43 and 45 defined by the harvesting unit housing 32. In a most preferred form of the invention, each discharge opening through which the doffed cotton exits the housing 32 of the harvesting unit is in a vertical plane extending substantially tangent with the periphery of the doffer pads on the respective doffer assembly.

The spindle rotor assemblies 38 and 40 and the respective doffer assemblies 42 and 44 are driven by a conventional drive assembly 46. As illustrated in FIG. 3, such a drive assembly 46 includes a bevel gear transmission mounted in a gear housing 48 preferably arranged toward an upper end of each harvesting unit housing 32. As illustrated in FIG. 2, input drive shafts 50 and 52 extend forwardly from opposite sides of frame 12 to provide power to the drive assemblies 46. In the illustrated embodiment, telescopic drive shafts 54 transmit power and torque between adjacent harvesting units and permit lateral displacement of the harvesting units with respect to each other.

A support structure, indicated generally by reference numeral 56 in FIG. 2, is provided for individually connecting each of the harvesting units to the frame 12 for vertical and lateral movement relative thereto. The support structure 56 is preferably of the type disclosed in co-assigned and co-pending U.S. patent application Ser. No. 07/436,304 filed Nov. 13, 1989. As disclosed in detail therein, the support structure 56 includes a lift assembly 58, at least one laterally elongated tool bar assembly 60 supported at a forward end of the lift assembly 58, and individual slide support structures 62 associated with and connecting each harvesting unit to the tool bar assembly 60.

As illustrated in FIG. 2, outer and inner harvesting units 22 and 24, respectively, are adjacently mounted on the tool bar assembly 60 and define a first harvesting set. Each of the harvesting units 22 and 24 is laterally and slidably movable to adjust for various row widths and to open up space between adjacent harvesting units to facilitate servicing thereof. Inner and outer harvesting units 28 and 30, respectively, are adjacently mounted on the tool bar assembly 60 and define a second harvesting set. Each harvesting unit 28 and 30 is laterally and slidably movable relative to an adjacent harvesting unit to adjust for row widths and to open up space between adjacent harvesting units to facilitate servicing thereof. As illustrated, harvesting unit 26 is fixedly secured between inner harvesting units 24 and 28.

Lift assembly 58 operates as a four-bar parallelogram-type linkage. As illustrated in FIG. 2, lift assembly 58 includes left-hand lift members 63 and 64 which are pivotally connected to and forwardly extend from one side of the frame 12 and have tool bar assembly 60 connected to the distal ends thereof. Lift assembly 58 further includes right-hand lift members 65 and 66 which are pivotally connected to and forwardly extend from an opposite side of the frame 12 and have the tool bar assembly 60 connected to distal ends thereof. Lift assembly 58 in combination with tool bar assembly 60 permits the harvesting units to be vertically moved between lowered and raised positions while maintaining the harvesting units in a generally parallel relationship with the ground surface over which the harvester moves.

Each slide support structure 62 connects an associated harvesting unit to the tool bar assembly 60 in a manner allowing independent slidable and lateral movements between the ends of the tool bar assembly while concurrently inhibiting pivotal movement of the harvesting unit about the elongated length of the tool bar assembly.

A driver mechanism 67 is provided for facilitating powered movement of the harvesting units 22, 24 and 28, 30 along the tool bar assembly 60. As described in detail in the aforementioned patent application, the drive mechanism 67 includes a pair of drivers 68 and 69 for effecting powered linear movement of the harvesting units 22, 24 and 28, 30, respectively. In the illustrated embodiment, each driver is in the form of a linearly distendable hydraulic cylinder which extends generally parallel to the bar assembly 60 and is preferably connected to the outer harvesting unit of a respective harvesting set and is selectively coupled to the inner harvesting unit of a respective harvesting set. Each driver is operated from the cab region of the harvester to allow the harvesting units to be linearly moved outwardly from and then returned to their harvesting positions. Each driver includes a preset stop which determines the harvesting position of the harvesting units.

In the illustrated embodiment, each harvesting unit has first and second conveying structures 72 and 74 rearwardly extending from the doffer assemblies 42 and 44, respectively. Each conveying structure receives cotton from a doffer assembly through a discharge opening defined by the housing on the harvesting unit. Each conveying structure includes a cotton receiving assembly and a duct extending from the receiving assembly for directing the doffed cotton between the harvesting unit and the cotton receptacle 20.

The majority of cotton conveying structures on the cotton harvesting units are arranged outwardly of the lift members 63, 64 and 65, 66 of the lift assembly 58. Those conveying structures arranged outwardly of the lift members of the lift assembly can be constructed substantially in accordance with the teachings of coassigned U.S. Pat. No. 4,501,112. Suffice it to say, a hinge connection 76 (FIG. 1) is arranged between and separates a suction door assembly from the respective duct. Hinge connection 76 allows the suction door assembly to be connected to and laterally moved with the harvesting unit along the tool bar assembly while the duct is held stationary to the frame of the harvester. The hinge connection 76 furthermore maintains the suction door assembly and duct in cotton conveying relation as the harvesting unit is laterally moved along the tool bar assembly.

Other conveying structures, and particularly those associated with the central harvesting unit 26 and the inboard conveying structures associated with laterally movable inner harvesting units 24 and 28, extend, at least in part, through the limited space defined between the lift members 63, 64 and 65, 66 of the lift assembly and toward the cotton receptacle 20. As an example, both conveying structures 72 and 74 of the central harvesting unit 26 extend upwardly through the limited space between the lift members of the lift assembly. Because harvesting unit 26 remains laterally stationary on the tool bar assembly 60, however, the ducts extending through the limited space can readily be configured to avoid structural or driveline interferences.

Cotton conveying structure 72 extending from inner harvesting unit 24 and the cotton conveying structure 74 extending from inner harvesting unit 28 both have at least a portion thereof extending upwardly through the limited space defined between the lift arms. Unlike the central harvesting unit 26 which remains laterally stationary on the tool bar assembly, however, the inner harvesting units 24 and 28 are both adapted for lateral movement along the tool bar assembly 60 to facilitate access between the harvesting units.

According to the present invention, and as illustrated in FIGS. 4 and 5, the cotton conveying structure 72 associated with laterally movable harvesting unit 24 is generally aligned in a fore-and-aft direction with and configured to receive cotton from a forward doffer assembly 42 when harvesting unit 24 is in a harvesting position as illustrated. The conveying structure 72 associated with doffer assembly 42 of laterally movable harvesting unit 24 is an integral structure which remains laterally stationary while allowing for lateral movement of the respective harvesting unit relative thereto.

As illustrated in FIG. 5, the conveying structure 72 associated with laterally movable harvesting unit 24 includes a cotton receiving assembly 78 which is connected and opens to generally stationary duct structure 80 supported on the frame of the harvester and extending toward the basket or receptacle 20. The receiving assembly 78 for cotton conveying structure 72 includes first and second conveying sections 82 and 84, respectively. The first and second conveying sections 82 and 84 are integrally connected to each other and are carried and supported by the adjacent stationary harvesting unit 26.

In the illustrated embodiment, suitable support brackets 86 extending from stationary harvesting unit 26 connect the receiving assembly 78 of conveying structure 72 to harvesting unit 26 such that it is inhibited from lateral movement with but is permitted to move in a generally vertical direction along with displacement of harvesting unit 26. In a preferred form, and to facilitate access to the harvesting mechanism of harvesting unit 26, the first conveying section 82 of the cotton receiving assembly 78 is removably connected by support bracket 86 to the adjacent stationary harvesting unit 26 while the second conveying section 84 is fixedly secured by support bracket 86 to the stationary harvesting unit 26.

In the illustrated embodiment, the first conveying section 82 of receiving assembly 78 is a vertically elongated suction door which is spaced in a fore-and-aft direction from housing 32 of harvesting unit 24 and defines a collection chamber and having an inlet 88. The inlet 88 to the suction door or first section 82 is of substantially coequal length to the respective discharge opening 43 defined by the harvesting unit housing 32. When harvesting unit 24 is in a harvesting position, cotton flows from the doffer assembly 42 through opening 43 and directly into the first conveying section 82 of the receiving assembly 78. Albeit remains laterally fixed relative t the tool bar assembly 60, the cotton conveying structure 72 allows for relative lateral movement of the harvesting unit 24 along the support structure.

In the illustrated embodiment, the first conveying section 82 has a rear wall 90 which is generally opposite to the inlet 88 and against which the doffed cotton impinges. The doffed cotton impinges against the rear wall 90 and falls toward an outlet 92 generally located at the lower end of the suction door 82 and which is defined by an elbow portion 94 on the conveying structure 74.

The second conveying section 84 defines a generally hollow conveying chamber and is integrally connected in conveying relationship with the first conveying section 82. In the preferred embodiment, the second conveying section 84 extends generally horizontally away from the first conveying section 82 and is supported by the housing 32 of harvesting unit 26. As illustrated in FIG. 5, the horizontal feature of the second section 84 allows it to extend beneath the tool bar assembly 60. An outlet end 96 of the second conveying section 8 is connected to the duct structure 80 which extends upwardly between the lift members of the lift assembly 58.

According to the present invention, and as illustrated in FIGS. 6 and 7, the cotton conveying structure 74 associated with laterally movable harvesting unit 28 generally aligned in a fore-and-aft direction with and is configured to receive cotton from a rear doffer assembly 44 when harvesting unit 28 is in a harvesting position as illustrated. The conveying structure 74 associated with doffer assembly 44 of laterally movable harvesting unit 28 is an integral structure which remains laterally stationary relative to the tool bar assembly 60 while allowing for lateral movement of the respective harvesting unit relative thereto.

As illustrated in FIG. 7, the conveying structure 74 associated with laterally movable harvesting unit 28 includes a cotton receiving assembly 98 which is connected and opens to generally stationary duct structure 100 supported on the harvester frame and extending toward the basket or receptacle 20. The receiving assembly 98 for cotton conveying structure 74 includes first and second conveying sections 102 and 104, respectively. The first and second conveying sections 102 and 104 are integrally connected to each other and are carried and supported by the support structure 56.

In the illustrated embodiment, a suitable support bracket 106 depends from the tool bar assembly 60 to connect the receiving assembly 98 of conveying structure 74 to the support structure 56. The conveying structure 74 of harvesting unit 28 is connected to the support structure 56 such that it is inhibited from lateral movement but is permitted to move in a generally vertical direction along with displacement of harvesting unit 28.

In the illustrated embodiment, the first conveying section 102 of receiving assembly 98 is a vertically elongated suction door which is spaced in a fore-and-aft direction from housing 32 of harvesting unit 28 and defines a collection chamber and having an inlet 108. The inlet 108 to the suction door or first conveying section is of substantially coequal length to the respective discharge opening 45 defined by the harvesting unit housing 32. Cotton flows from the doffer assembly 44 of harvesting unit 28, through discharge opening 45 and directly into the first conveying section 102 of the receiving assembly 98. Albeit remains laterally fixed relative to the tool bar assembly 60, the cotton conveying structure 74 allows for lateral movement of the harvesting unit 28 along the support structure of tool bar assembly 60.

In the illustrated embodiment, the first conveying section 102 has a rear wall 110 which is generally opposite to the inlet 108 and against which doffed cotton impinges. The doffed cotton impinges against the rear wall 110 and falls toward an outlet 112 generally located at the lower end of the suction door 102 and which is defined by an elbow portion 114 on the conveying structure 74.

The second conveying section 104 defines a generally hollow conveying chamber that is integrally connected to and in conveying relationship with the first conveying section 102. In the preferred embodiment, the second conveying section 104 extends upwardly and away from the elbow portion 114. An outlet end 116 of the second section 104 is connected to the duct structure 100 which extends upwardly between the lift members of the lift assembly 58.

To facilitate the conveyance of cotton to the cotton receptacle 20, each cotton conveying structure 72, 74 is provided with an air nozzle 120 (FIGS. 5 and 7). When used with the conveying structure of the present invention, the air nozzle 120 is preferably located downstream of the first conveying section 82, 102 of the respective conveying structure. In a most preferred form, the air nozzle 120 is connected to and extends within the second conveying section 84, 104 of the respective conveying structure.

When the respective harvesting units 24 and 28 are located in a harvesting position, as illustrated in FIG. 1, the cotton receiving assemblies 78, 98 of the conveying structures 72, 74, respectively, are aligned in direct cotton receiving relation with the doffer assemblies 42, 44 of harvesting units 24, 28, respectively. When the support structure 56 and the harvesting units connected thereto are vertically moved, the conveying structures 72, 74 move simultaneously therewith. When it is desirable to gain access between the center harvesting unit 26 and adjacent inner harvesting units 24 and 28, the inner harvesting units 24 and 28 can be laterally slid or rolled along the tool bar assembly 60 to facilitate and provide such access. Powered movement of the harvesting unit along the tool bar assembly 60 can be accomplished through driver mechanism 67.

Although supported for vertical movement with the harvesting units, the conveying structures 72 and 74 associated with doffer assemblies 42 and 44 of harvesting units 24 and 28, respectively, are inhibited against lateral movement. Therefore, lateral sliding movement of the harvesting units 24 and 28 from their harvesting positions will move the discharge openings 43 and 45, respectively, out of registry with the receiving assemblies 78, 98 of conveying structures 72, 74, respectively, which are inhibited against lateral movement. Allowing the harvesting units 24, 28 to laterally move relative thereto while maintaining the conveying structures 72, 74 associated therewith as integral assemblies facilitates the design of the conveying structures through a limited space defined between the lift members of the lift assembly. Inhibiting the conveying structures 72 and 74 against lateral movement will furthermore facilitate alignment with the respective doffer assemblies 42 and 44 when the harvesting units 28 and 24 are returned to their harvesting positions.

In the illustrated embodiment, the first and second conveying sections of the receiving assemblies 78, 98 of the conveying structures 72, 74, respectively, are integrally connected to each other and supported in a manner inhibiting lateral movement. As will be appreciated, one conveying section of each receiving assembly positions the other conveying section relative to the discharge opening in the harvesting unit. Accordingly, there is no need to disconnect and connect large and cumbersome structures to allow lateral displacement of the respective harvesting unit.

Once servicing of the harvesting unit is complete, the harvesting unit is simply slid or rolled back to the harvesting position. When the harvesting units are laterally moved under the influence of driver mechanism 67, the harvesting units are laterally moved until the stop on the respective driver inhibits further lateral movement of the harvesting unit. As will be appreciated, the stop is set on the respective driver such that when the harvesting unit is returned to its harvesting position, the inlet to the respective cotton conveying structure will automatically align in cotton conveying registry with the discharge opening in the respective harvesting unit housing.

The air nozzle 120 is connected to a suitable source of pressurized air. During operation, a jet of air is exhausted from the air nozzle into the cotton conveying structure, thereby creating a vacuum at the outlet of the respective first section and facilitating passage of cotton therethrough. Maintaining a stationary relationship of the conveying structures 72 and 74 relative to the frame facilitates connecting the air nozzle to the source of air.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. Cotton conveying structure for a harvesting unit of cotton harvester, said cotton harvester having a mobile fore-and-aft frame movable over a field of cotton plants, cotton receptacle means, a harvesting unit support structure connected to said frame for generally vertical movement, and wherein said harvesting unit is supported by said support structure for lateral movement form a harvesting position and includes a housing with spindle means arranged within said housing for removing cotton from plants and doffer means for doffing cotton from the spindles and propelling the doffed cotton through an opening defined by said housing, said cotton conveying structure comprising:

cotton conveying duct structure leading to said cotton receptacle means, and wherein at least a portion of said duct structure passes through a limited space defined by said support structure and is inhibited against lateral movement thereby; and a cotton receiving assembly vertically movable with and inhibited form lateral movement relative to said support structure and in cotton conveying relation with said duct structure for allowing lateral movement of said harvesting unit relative thereto, said cotton receiving assembly being mounted independently of said laterally movable harvesting unit and including first and second conveying sections, said first conveying section having upright panel structure against which doffed cotton impinges and defining an inlet of generally coequal length to the opening in said harvesting unit and arranged opposite of said panel structure and which, when said harvesting unit is in a harvesting position, is generally aligned in a fore-and-aft direction in direct cotton receiving relationship with the opening of said harvesting unit, and wherein said second conveying section is integrally connected to and in conveying relationship with said first conveying section for conveying doffed cotton between said harvesting unit and said duct structure.

2. The cotton conveying structure according to claim 1 further including air nozzle means extending within said cotton receiving assembly for facilitating the conveyance of cotton to said cotton receptacle means.

3. The cotton conveying structure according to claim 1 wherein said first conveying section is connected to said support structure for movement therewith.

4. Cotton conveying structure for receiving cotton from at least one of a plurality of harvesting units of a cotton harvester, said cotton harvester having a fore-and-aft frame movable over a field of cotton plants, cotton receiving receptacle means, a vertically movable harvesting unit support structure carried at a forward end of a lift assembly including a pair of laterally spaced lift arms extending forwardly from said frame, each of said harvesting units being individually mounted on said support structure and includes a housing with spindle means arranged therewithin for removing cotton from the plants and doffer means for doffing cotton from the spindles and propelling the doffed cotton through an opening defined by said housing, with at least one of said harvesting units being mounted for lateral movement on said support structure from a harvesting position and relative to an adjacent and stationary harvesting unit to enhance spacing therebetween, said cotton conveying structure comprising:

duct structure extending toward said cotton receiving receptacle means, wherein at least a portion of said duct structure extends between said laterally spaced lift arms and is inhibited against lateral movement thereby; and a cotton receiving assembly vertically movable with and inhibited from lateral movement relative to said support structure and which allows lateral movement of said movable harvesting unit relative thereto, said cotton receiving assembly including first and second conveying sections, with said first and second conveying sections being mounted in a fore-and-aft relationship relative to and independent of said movable harvesting unit to allow said movable harvesting unit to be laterally moved from said harvesting position, whereat an inlet of said first conveying section is generally aligned in a fore-and-aft direction with and directly receives doffed cotton from the opening in said movable harvesting unit, to an accessible service position and wherein the first conveying section further includes a forwardly facing rear panel having an outlet at a lower end thereof, and wherein the second conveying section is integrally connected to and extends rearwardly from the outlet defined by said first conveying section for conveying doffed cotton from said movable harvesting unit and between said lift arms to said cotton receptacle means.

5. The cotton conveying structure according to claim 4 further including air directing nozzle means connected to and extending within said cotton receiving assembly for facilitating cotton conveyance toward said cotton receptacle means.

6. The cotton conveying structure according to claim 4 wherein said cotton receiving assembly is connected to said support structure for movement therewith.

7. The cotton conveying structure according to claim 4 wherein said cotton receiving assembly further includes means for mounting said receiving assembly on said adjacent and stationary harvesting unit for movement therewith.

8. Cotton conveying structure for a harvesting unit of a cotton harvester, said cotton harvester having a mobile fore-and-aft frame movable over a field of cotton plants, cotton receptacle means, a vertically movable harvesting unit support structure connected to said frame by a lift assembly including a pair of lift arms forwardly extending from said frame, wherein said harvesting unit is supported by said support structure for lateral movement form harvesting position and includes a housing defining a plant passage with first and second spindle means arranged with in said housing on opposite sides of said plane passage for removing cotton from plants and first and second doffer means for doffing cotton from the respective first and second spindle means and propelling the doffed cotton through first and second openings defined by said housing on opposite sides of said plant passage, said cotton conveying structure comprising:

first cotton conveying means arranged outwardly from said lift arms for vertical and lateral movement with said harvesting unit for receiving and conveying doffed cotton form said first doffer means through said first opening to said cotton receptacle means; and second cotton conveying means arranged inwardly of said lift arms for vertical movement with the inhibited form lateral movement relative to said lift arms, said second conveying means including first and second conveying sections which are mounted to extend rearwardly from and independently of said harvesting unit such that said harvesting unit is movable relative thereto, and wherein one conveying section is connected to and positions the other conveying section of said conveying means against lateral movement relative to and with vertical movement of said harvesting unit such that, when said harvesting unit is in a harvesting position, an inlet of said first conveying section which extends of generally coequal length to the second opening in said harvesting unit and is generally aligned in a fore-and-aft relationship with and directly receives doffed cotton from the second opening, and wherein the second conveying section is connected to and extends rearwardly from said first conveying section for conveying doffed cotton from said harvesting unit and between said lift arms toward said cotton receptacle means.

9. The cotton conveying structure according to claim 8 wherein at least one of said conveying means is supported by said support structure for movement therewith.

10. The cotton conveying structure according to claim 8 wherein said first conveying section further includes a rear panel structure arranged opposite to said opening and defines an outlet toward a lower end thereof through which cotton flows toward said second conveying section.

11. The cotton conveying structure according to claim 8 further includes nozzle means arranged downstream of said first conveying section for directing a jet of air into said cotton conveying structure thereby creating a vacuum at the outlet of said first conveying section and facilitating passage of cotton therethrough.

* * * * *